Patented July 24, 1934

1,967,253

UNITED STATES PATENT OFFICE 1,967,253

MODULATED HIGH FREQUENCY GENERATOR

Wellington W. Muir, Lockport, N. Y.

Application June 15, 1931, Serial No. 544,617

5 Claims. (Cl. 179—171)

This invention relates to the modulation of an alternating current by a current of less frequency and provides a circuit therefor which in effect is a generator for output purposes of any character.

Several forms of my invention are illustrated in the accompanying drawings in which.

Figure 1:
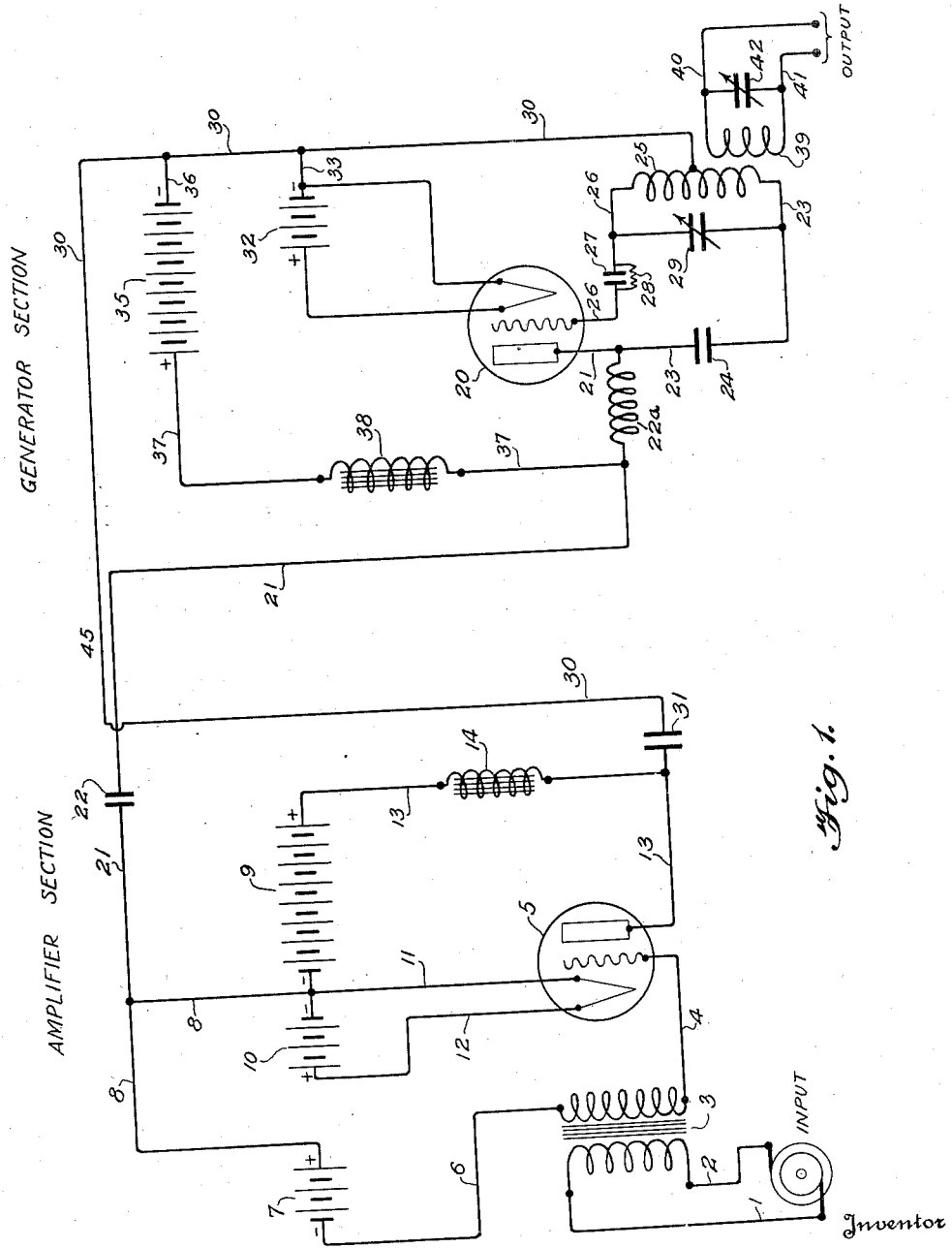
Fig. 1 is a circuit diagram of one arrangement of my modulating system comprising a generator section and an amplifier section.

Referring to Fig. 1 of the drawings, alternating current from any desirable source is transmitted over the wires 1 and 2, and through the primary coil of a transformer 3, the secondary coil of which is connected on one side as by the wire 4 to the grid of a three-electrode vacuum amplifying tube generally indicated by the numeral 5. The other side of the secondary coil is connected as by the wire 6 to the negative side of a "C" battery 7 so that the negative potential applied to the grid will be sufficient to cause the tube to operate on the straight portion of the characteristic curve as will be readily understood. The positive side of said battery is connected as by the wire 8 to the negative side of the plate battery 9 and also to the negative side of the filament battery 10. The negative sides of both the plate and filament batteries are connected to one side of the filament of the tube 5 as by the wire 11, the other end of said filament being connected as by the wire 12 to the positive side of the filament battery. The plus side of the plate battery 9 is connected to the plate of said tube as by the wire 13 having serially connected therein a choke coil 14.

The filament of the amplifier tube 5 is connected to the plate of a three-electrode vacuum generator tube 20 as by the wires 11, 8 and 21, the wire 21 having connected therein a condenser 22 disposed in the amplifying section of the circuit and a choke coil 22a of a size governed by the frequency of the current generated by the generator. The plate of the generator tube 20 is connected to the grid of said tube as follows; by wire 23 joining wire 21 and containing a condenser 24, said wire 23 leading to one end of an oscillator coil 25, the other end of which is connected as by the wire 26 to the grid, with a grid condenser 27 interposed in the latter wire and a grid leak 28 associated with said condenser. A variable condenser 29 is disposed in shunt relation around the oscillator coil 25 whereby the capacity of the variable condenser 29 will naturally be in accordance with the frequency of the current desired to be generated by the tube 20.

A wire 30 is connected to one of the turns on the plate side of the coil 25 which will give the best results, which wire 30 leads from said coil back to the amplifying section of the circuit, joining the wire 13 connected to the plate of the amplifying tube, with a condenser 31 disposed in said wire 30. The filament of the generator tube is connected as usual in circuit with a battery 32, the negative side of said battery being connected as by the wire 33 to the wire 30. A plate battery 35 has its negative terminal connected as by the wire 36 to the wire 30, and its positive terminal connected as by the wire 37 to the wire 21 with a choke coil 38 serially connected in said wire 37. These last named connections are such that current from the battery 35 will pass over the wire 37 through the choke coil 38 and thence through the choke coil 22 and wire 21 into the plate of the generator tube 20, thence across the tube to the filament and back to the wires 30 and 36 to the negative side of said battery.

The plate side of the oscillator coil 25 has inductively associated therewith the output circuit coil 39 whose ends are connected respectively as by the wires 40 and 41 to the output terminals of this device. These terminals may have connected thereto any form of output such as an antenna and a counterpoise, whereby this entire device becomes a modified transmitting circuit. A variable condenser 42 may be connected in shunt relation with respect to the coil 39 for the purpose of increasing to the maximum the transfer of energy between the coils 25 and 39.

The operation of Figure 1 is as follows. The battery 10 heats the filament of the amplifying tube 5, the electrons from said filament in passing to the plate of said tube being intercepted by the potential on the grid in said tube, said potential being varied as readily understood by the fluctuations of the alternating current set up in the grid circuit from the primary of the transformer 3.

It thus results that as the positive potential of the grid is increased, there will be a corresponding increase in the flow of current from battery 9 through the plate of the tube, and likewise when the negative potential of said grid is increased, there will be a corresponding decrease in said battery current through said plate. The current variations thus established in the plate battery circuit will create an alternating current over the wire 30 by virtue of the condenser 31, and the alternating current so set up in the wire 30 will be automatically transferred to the grid of the generator tube 20 through the oscillator coil 25, wire 26, and condenser 27, it being remembered that the wire 30 is connected to the low potential side of said coil 25.

It is to be particularly observed that, according to this invention, the plate of the amplifying tube 5 is connected to the filament of the generator tube 20 and the filament of tube 5 is connected to the plate of tube 20 whereby when the positive potential of the grid in tube 5 increases and increases the space current of tube 5 there is a corresponding increase in the space current of tube 20. It therefore results that when the positive potential in the grid of tube 5 is increased, there will be an increase in the output of the generator tube 20, thereby increasing the output across the terminals of wires 40 and 41. This is also true, in the reverse order, when variations occur in the negative potential on the grid of the amplifying tube or, in other words, the output across wires 40 and 41 is decreased in accordance with the increase in negative potential of the grid of the amplifying tube.

This is a distinct departure from heretofore known circuits wherein the output is increased due to the increase in the negative potential of the grid of the amplifying tube.

The wire 21 provides a return path for the low frequency currents transmitted from the amplifying section to the generator section. Under some conditions it may be found desirable to make the impedance of the circuit including the wire 21 and choke coil 22 less for the high frequency currents than the impedance of the circuit including the wire 30 for the low frequency currents, and this may be done in various ways. For example, a portion of the wires 21 and 30 may be brought into close proximity with each other as indicated at 45 whereby the high frequencies may pass directly between the wires 21 and 30 in seeking a path of least resistance, whereby said high frequencies will be confined to the generator section, although the low frequencies of said amplifying section are freely transmitted to the generator section. In such case the impedance of the choke coil 22 may be reduced to assist in the maintenance or confinement of the high frequencies in the generator section. In other words, the impedance of the coil 22 is never 100% effective in preventing high frequency current from passing therethrough, and therefore any leakage past the coil will be by-passed between the wires 21 and 30 by reason of their close proximity. It therefore results that this invention is particularly valuable in keeping separated the high and low frequencies, or in other words, in preventing both high and low frequencies in the amplifying tube as a result of which according to prior circuits there has been great distortion.

Thus it will be seen that according to this invention there is provided a modulating system having a high percentage of modulation, and which is substantially free from distortion. That is to say, in the particular example shown in the diagram and due to the connections, 100% modulation is attained whereas if the connections were reversed so that the plates of the two tubes 5 and 20 were connected, there would result only a modulation of about 40%.

Figure 2:
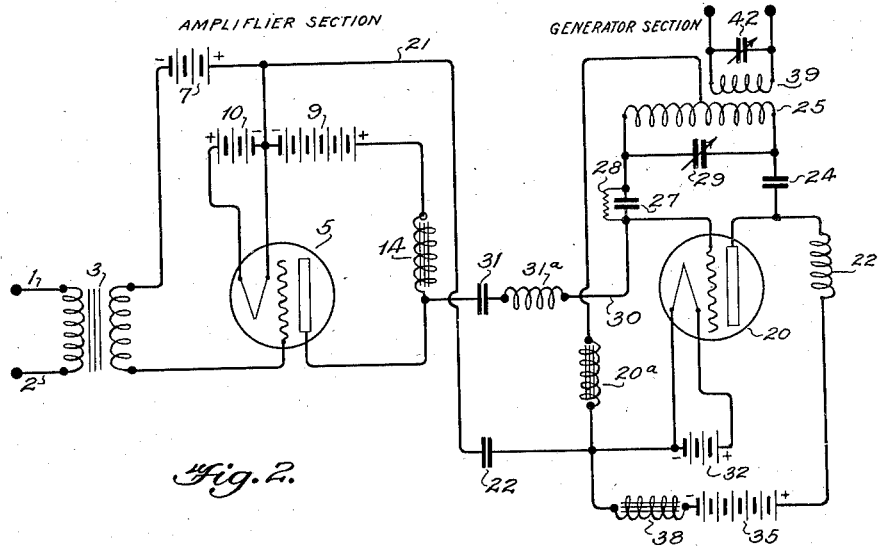
Figs. 2 and 3 are circuit diagrams illustrating two different methods of connecting the amplifier section to the generator section.

The modification shown in Figure 2 is substantially like that shown in Figure 1 except for the manner of connecting the amplifier section with the generator section. Like reference numerals indicate corresponding elements in the various figures of the drawings. In Figure 2 it will be seen that the connection from the plate of the amplifier tube 5 is made directly to the grid element of the generator tube 20 through a condenser 31, a high frequency choke coil 31a being connected in series in the line 30. The connection from the filament of the amplifier section to the filament of the generator section by line 21 and condenser 22 is the same as in Figure 1. A choke coil 20a is inserted in the connection between the filament of tube 20 and the midpoint on coil 25 in the generator section to prevent undue flow of low frequency current through this connection from the amplifier section. This coil might conveniently be shunted by a small condenser to by-pass the high frequency current, or the coil may be omitted from the connection entirely in case the leak resistance 28 is of sufficient high resistance. The operation of Figure 2 will be readily understood from the foregoing description of the operation of Figure 1. Choke coil 31a is inserted in line 30 to prevent high frequency currents from flowing back to the amplifier section. Choke coil 38 prevents the flow of low frequency current in the plate circuit of tube 20.

Figure 3:
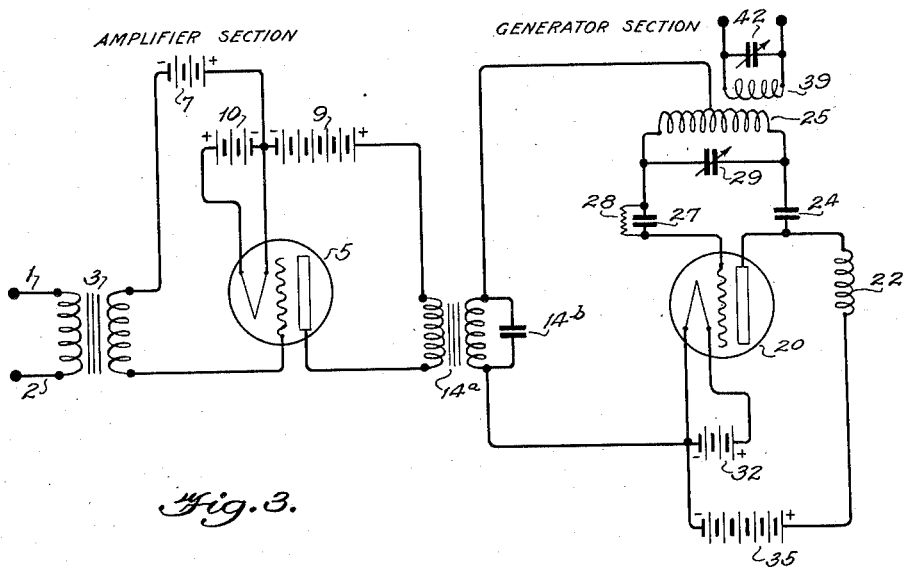

The arrangement shown in Figure 3 is a third modification of my modulating system showing another manner of connecting the amplifier section to the generator section. In this arrangement, the impedance coil 14 in the plate circuit of the amplifier is replaced by a transformer 14a, and the secondary of this transformer is connected in the position normally occupied by the choke coil 20a in Figure 2, that is, in the connection between the filament of the tube 20 and the midpoint tap on coil 25. A small condenser 14b may be connected in shunt to the secondary of transformer 14a in order to by-pass the high frequency current generated by the generator section.

In the operation of Figure 3, the generator section is adjusted so that normally a high frequency current of constant amplitude is generated. Modulating current from the amplifier section is supplied at the secondary of transformer 14a and serves to vary the potential of the grid of tube 20 with respect to the filament and, through the action of the various elements, causes the amplitude of the high frequency current to be varied in accordance with the low frequency current from the amplifier section.

It will be understood that the modulating current may be derived from any suitable source, and the frequency may be either low or high provided, however, that the modulating current is of lower frequency than the current generated by the generator section. It will also be understood that instead of the carrier wave being generated by the vacuum tube 20, this tube may take the form of a modulator tube, and the carrier wave may be supplied to the grid circuit of this modulator tube from any suitable independent source, such as a vacuum tube generator or a piezo-electric crystal generator. With this modification the connections 21 and 30 from amplifier 5 would respectively lead to the plate and grid element of the modulator tube, and the output coil 39 would be coupled to a radio frequency coil connected in the plate circuit of the modulator tube. Such a modification is shown in Figure 4.

Figure 4:
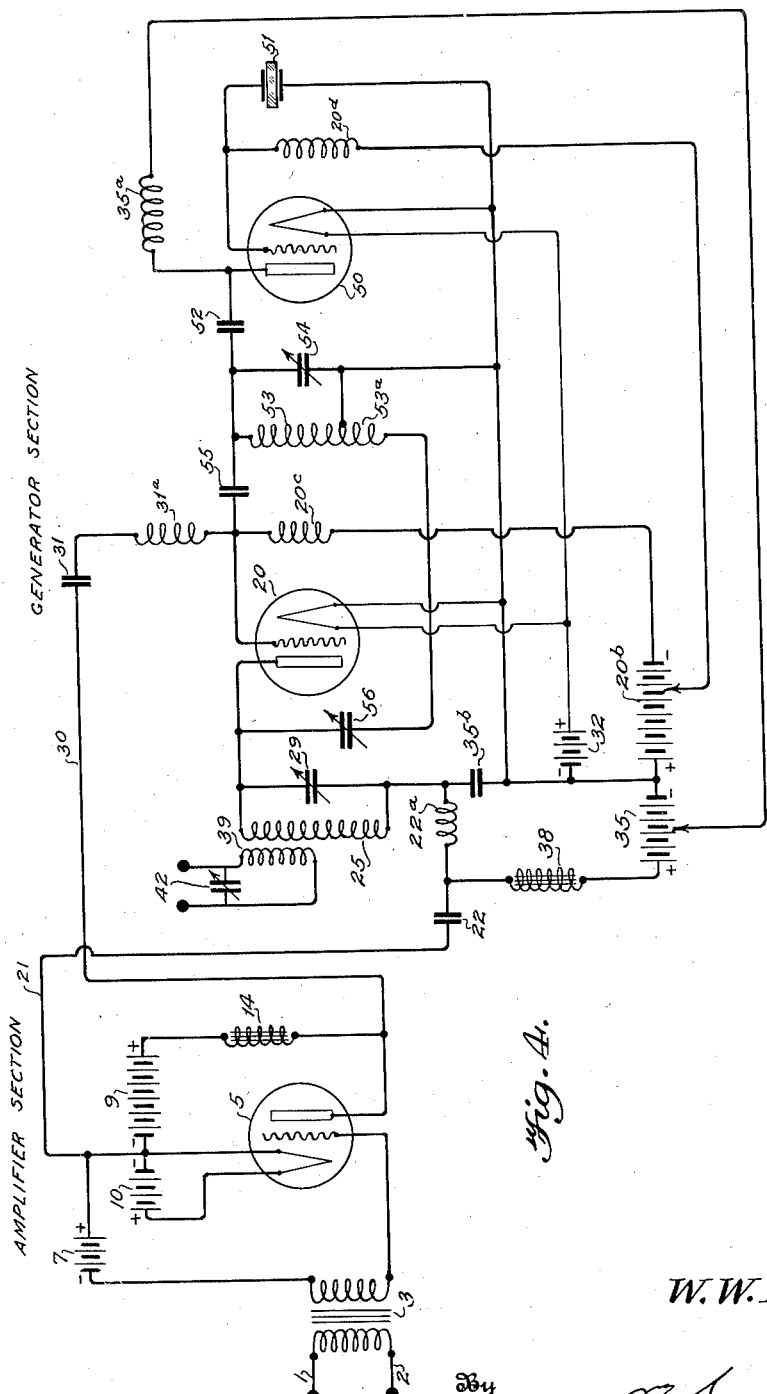
Fig. 4 is a circuit diagram illustrating a fourth modification of my invention.

In Figure 4, the amplifier section is the same as in the preceding figures, but in the generator section, the tube 20 no longer functions as a self-oscillating generator but serves as a modulator, and the carrier current is generated by a separate tube 50 provided with a piezo-electric crystal 51 connected in its input circuit. Modulating tube 20 is supplied with plate current from battery 35 through choke coils 38 and 22a, and coil 25. Plate current is also supplied to tube 50 from battery 35 through a high frequency choke coil 35a. Proper negative biasing potentials are supplied to the grids of tubes 20 and 50 from battery 20b through choke coils 20c and 20d respectively. The filaments of both tubes are heated from battery 32. A tuned oscillating circuit comprising inductance 53 and condenser 54 is connected in the output circuit of tube 50 by the condenser 52, and this oscillation circuit is connected to the input circuit of tube 20 by condenser 55. 53a is a portion of coil 53 connected in series with condenser 56 to the plate of tube 20, and is provided for the purpose of neutralizing the tube 20 to prevent self-oscillation of this tube. A condenser 35b is connected as shown to by-pass high frequency currents around battery 35 and choke coils 38 and 22a. The plate of amplifier tube 5 is connected to the grid of modulating tube 20 by line 30 which includes a condenser 31 and a high frequency choke coil 31a. The filament of the amplifier 5 is connected to the plate of modulator 20 by wire 21, condenser 22, high frequency choke coil 22a and coil 25. The output circuit of the modulator is coupled to the coil 25 by coil 39, as in the preceding arrangements.

The operation of Figure 4 will be apparent from the description of the operation of the various modifications given above. Under proper adjustment of the oscillation circuit 53, 54, the tube 50 with its associated circuit will generate continuous oscillations of constant amplitude, the frequency of which is determined by the natural period of oscillation of crystal 51. These oscillations are impressed upon the grid of tube 20, together with the lower frequency oscillations from the amplifier section. The action of the tube 20 with its associated circuits is to modulate or vary the amplitude of the high frequency carrier currents in accordance with the low frequency currents supplied from the amplifier section.

As it will be seen from the drawings, by providing the amplifier 5 and the generator 20 with separate "B" batteries, and by providing the special connection between these two units, including the wires 21 and 30 and condensers 22 and 31, there is provided a modulating system in which the high frequency current generated by the tube 20 is effectively prevented from reaching the amplifier tube 5 and its associated apparatus. Furthermore, only alternating current is supplied from the amplifying section to the generator section, thereby resulting in greater purity of modulation.

It therefore is apparent that this modulating system is a new form of grid-modulating system as distinguished from the plate-modulating systems of the prior art, this belief being supported by the fact that fairly good modulation is obtained when the connection 21—22 is omitted, leaving only the connection 30—31. It will be understood, however, that by using both connections there is obtained a higher percentage of modulation and of greater purity.

Practical tests have demonstrated the improved results obtained not only by the specific system disclosed in the drawings but by other circuits, and therefore it is not desired to be limited to any particular theory of operation, nor to the exact modification disclosed herein, except as may be required by the claims.

What is claimed is:—

1. A modulating system comprising the combination of a three-element vacuum tube modulator having input and output circuits, means for establishing high frequency alternating current in said input circuit, a source of space current for said modulator tube, a source of alternating current of lower frequency than said high frequency current, a three-element vacuum tube amplifier connected to said low frequency current source, a separate source of space current for said amplifier, a circuit connection for transmitting amplified low frequency currents from the filament of said amplifier to the plate of said modulator independently of the remaining electrodes of said modulator, a connection from the plate of said amplifier to one of the remaining electrodes of said modulator, and a condenser connected in one of said connections to prevent the flow of direct current in the connections.

2. A modulating system comprising the combination of a three-element vacuum tube generator having coupled input and output circuits for generating high frequency alternating current, a source of alternating current of lower frequency than said high frequency current, a three-element vacuum tube amplifier connected to said low frequency current, a source of space current for said amplifier separate from the plate current source of said generator, and a connection for transmitting amplified low frequency current between the plate element of said amplifier and the filament of said vacuum tube generator independently of said coupled circuits, said connection including means for preventing the flow of direct current in said connection.

3. A modulating system comprising the combination of a three-element vacuum tube generator having coupled input and output circuits for generating high frequency alternating current, a source of alternating current of lower frequency than said high frequency current, a three-element vacuum tube amplifier connected to said low frequency current, a source of space current for said amplifier separate from the plate current source of said generator, and independent circuit connections for transmitting amplified low frequency currents from the plate and filament elements of said amplifier to the filament and plate elements respectively of said generator tube, each of said connections including a condenser connected to prevent the flow of direct current in the connection.

4. A modulating system comprising the combination of a high frequency generator including a three-element vacuum tube, an oscillatory circuit formed of an inductance with a condenser connected in shunt thereto, a connection from an intermediate point on said inductance to the filament of said tube, a connection from one terminal of said oscillatory circuit to the grid of said tube including a condenser and a high resistance leak therefor, a connection from the other terminal of said oscillatory circuit to the plate element of said tube including a condenser, and a space current circuit for said tube including a high frequency choke coil, a low frequency choke coil and a source of space current connected in series between the plate and filament elements of said tube, an output circuit coupled to said oscillatory circuit; a source of modulating current of lower frequency than the current generated by said generator, a three-element vacuum tube amplifier connected to said source of low frequency current, a space current circuit for said amplifier independent of the space current circuit of said generator and including a low frequency choke coil and a source of plate current, a connection from the plate element of said amplifier to the filament of said generator, a connection from the filament of said amplifier to a point in the space current circuit of said generator between the high freqency choke coil and the low frequency choke coil, and a condenser included in each of said connections to exclude direct currents therefrom.

5. A modulating system comprising the combination of a thermionic relay having filament, grid and plate electrodes, input and output circuits for said relay, means for impressing high frequency alternating current upon said input circuit, a source of alternating current of lower frequency than said high frequency current, a three element vacuum tube amplifier connected to said low frequency current source, a separate source of space current for said amplifier, a circuit connection for transmitting amplified low frequency current from the filament of said amplifier to the plate of said modulator, a connection from the plate of said amplifier to the grid of said modulator, and a condenser connected in one of said connections to prevent the flow of direct current therein.

WELLINGTON W. MUIR.